Aug. 18, 1931.    D. FIRTH    1,819,284
HEAT CONTROL APPARATUS
Filed March 21, 1929    2 Sheets-Sheet 2
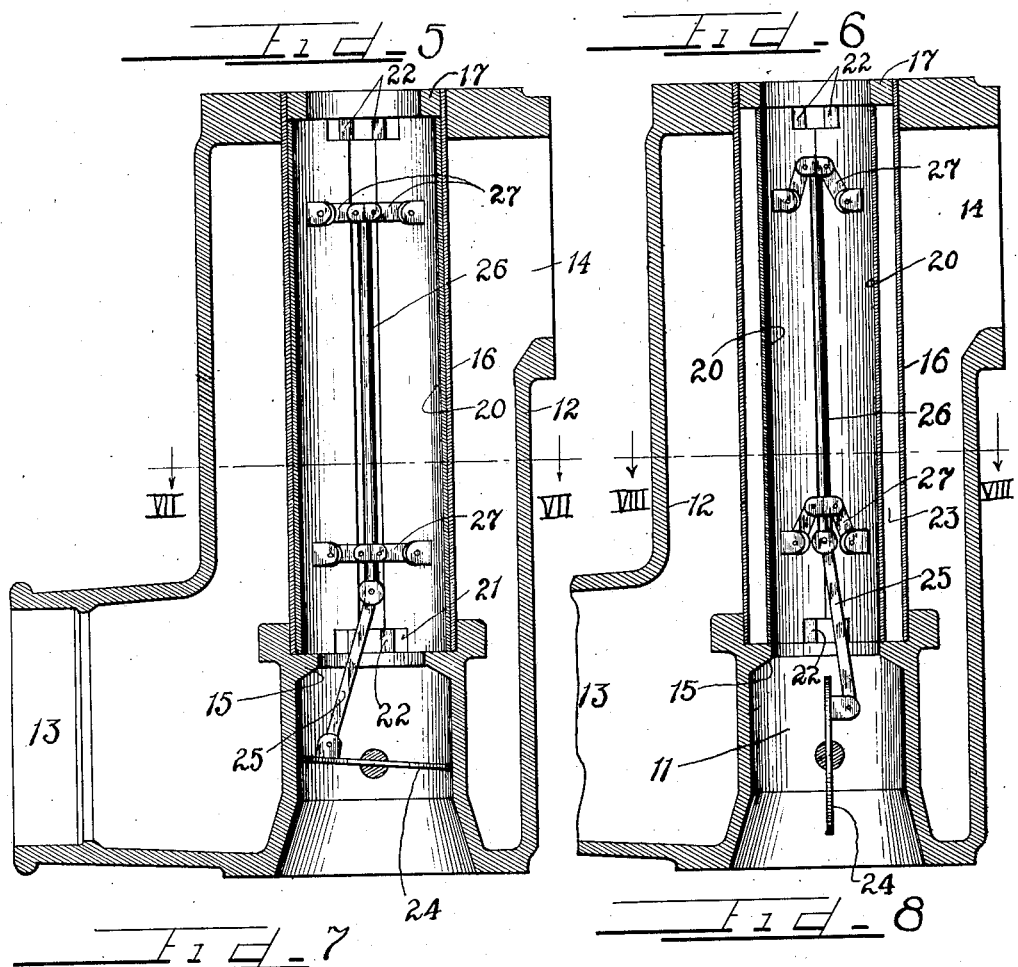
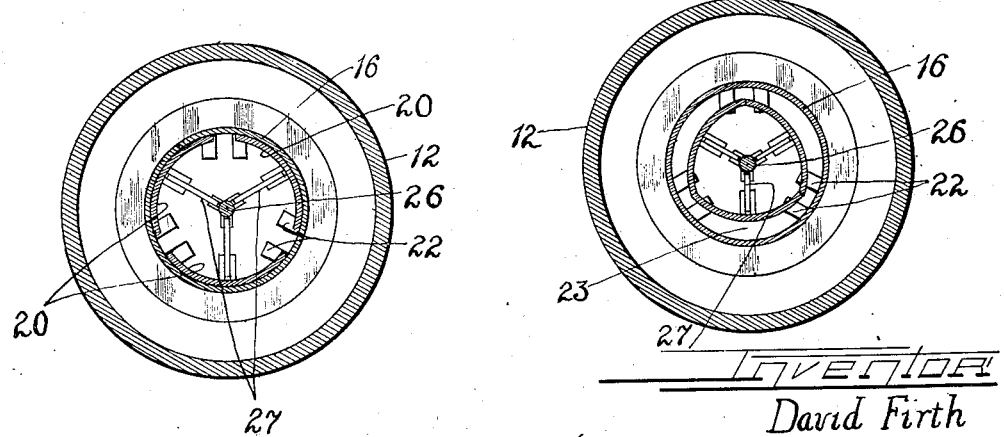
Inventor:
David Firth Patented Aug. 18, 1931

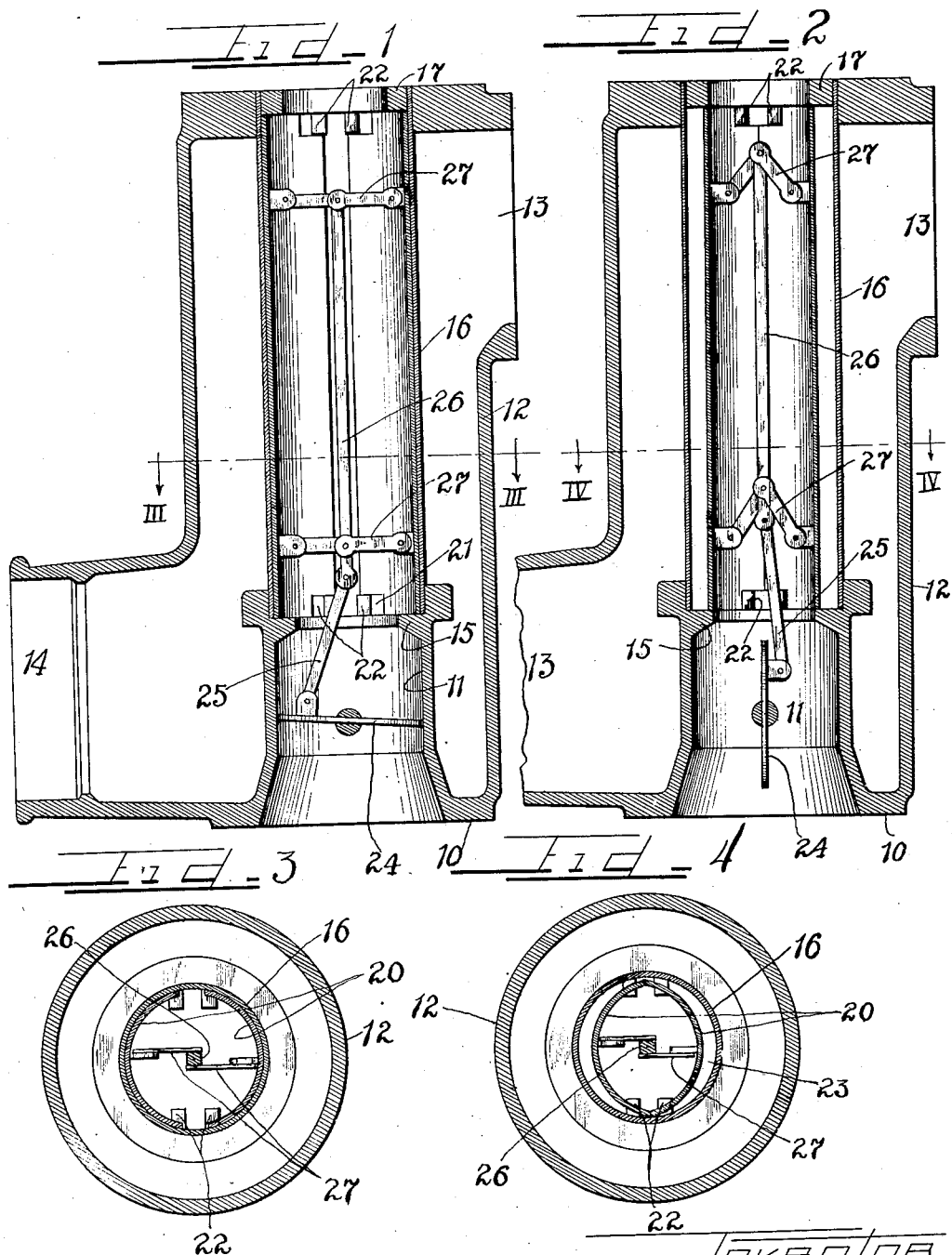

1,819,284

UNITED STATES PATENT OFFICE

DAVID FIRTH, OF FLINT, MICHIGAN, ASSIGNOR TO MARVEL CARBURETER COMPANY, OF FLINT, MICHIGAN, A CORPORATION OF ILLINOIS

HEAT CONTROL APPARATUS

Application filed March 21, 1929. Serial No. 348,709.

This invention relates to means for regulating the heat supplied to the intake manifold of an internal combustion engine.

One of the objects of the invention is to provide an improved and simplified mechanism in which a heat control for the explosive charge is adapted to be automatically varied in accordance with the requirements of the engine under varying operating conditions without requiring a direct control of the heating fluid with the accompanying movable valves in the heating fluid. More specifically, one embodiment of this invention comprises a heated portion of the intake manifold containing a split tube which is held in contact with the heated conduit wall under idling conditions and is withdrawn or collapsed together to form a separate conduit spaced from the heated wall and insulated therefrom by the dead air space formed outside the collapsed split tube. Such an arrangement does away with external operating levers and valves in the heat supply passages.

Another object of this invention is to provide an exhaust heated intake manifold wherein the exhaust gas passages are simplified and uncontrolled in operation, the heat control being entirely in the mixture passage. When the inner tube is collapsed to its smallest extent the space around it is a very good heat insulator, so that regardless of the temperature of the outer tube, which is exposed to the exhaust gases, the inner tube will be cooled by the inflowing mixture but not heated by the exhaust; whereas, when the inner tube is placed in metallic contact with the outer tube the conductivity of the combined walls is materially increased. Furthermore, the mixture which is then flowing has lost much of its velocity, both from the closing of the throttle and the increased sectional area of the passageway, so that with but a small movement of the walls of the inner tube a great range of operating temperatures may be obtained.

Other and further important objects of this invention will be apparent from the specification and accompanying drawings.

This invention (in a preferred form) is illustrated in the drawings and hereinafter more fully described.

On the drawings:

Figure 1 is a vertical section through an intake manifold riser embodying one form of the device of this invention, shown under idling conditions.

Figure 2 is a section similar to Figure 1 wherein the device of this invention is shown at full throttle position.

Figure 3 is a section on the line III—III of Figure 1.

Figure 4 is a section on the line IV—IV of Figure 2.

Figure 5 is a section similar to Figure 1 showing a modified form of this invention.

Figure 6 is a section similar to Figures 2 and 5.

Figure 7 is a section on the line VII—VII of Figure 5.

Figure 8 is a section on the line VIII—VIII of Figure 6.

As shown on the drawings:

A manifold riser embodying a mounting flange 10 is provided to receive a carbureter, a passage 11 leading upwardly therefrom within a casing 12 forming a heating jacket and having inlet and outlet openings 13 and 14 thereto. The passage 11 terminates in an internal shoulder 15 forming a restricted passage and at the same time supporting the lower end of a thin walled tube 16 of substantially the same diameter as the passage 11 at the upper end of the tube, which coincides with the top of the riser casing, a ring 17 is inserted in the tube and has an internal diameter approximately that of the shoulder 15, the shoulder and ring forming supports and guides for a split or segmental tube or lining, the individual segments 20 of which are notched at the corners, as indicated by the numeral 21, to fit over inwardly projecting guides 22 which maintain the alignment of the segments. In Figures 1 to 4 two segments are shown, whereas in Figures 5 to 8 three such segments are provided, the same reference numerals being used throughout for clearness.

In each case the segments, when in contact with each other at their edges, define an approximate circle substantially equal in area to the clear diameter of the shoulder 15 and ring 17, and thus form a dead air space 23 between the tube segments and the heated tube 16. As is well known, such a dead air space is an efficient heat insulator, thus materially reducing the transmission of heat from the tube 16 to the mixture flowing within the tube segments when in their contracted or collapsed positions.

In the embodiments chosen for illustration a throttle valve 24 is mounted in the passage 11. In order to operate the tube segments the throttle may conveniently be connected by a rod 25 and a vertical rod 26 joining a pair of two or three part knuckle or toggle joints 27. When the throttle is closed for idling the knuckle or toggle joints are flattened to spread out the tube segments 20 into contact with the heated tube 16. Conversely when the throttle is opened the tube segments are drawn inwardly or collapsed together as shown in Figures 2 and 6.

In the operation of the device of this invention, when the tube segments or lining 20 are in contact with the heated tube 16 the mixture passage is enlarged in area and the nearly closed throttle materially reduces the volume of mixture so that the rate of flow is greatly reduced, giving more time for heating the mixture while the metal to metal contact between the segments 20 and tube 16 materially increases the heat flow from the exhaust jacket. At the other extreme, when the segments 20 are collapsed together, a dead air space is formed which insulates the segments 20 from the heated tube 16 and the effective mixture passage is materially reduced in area while at the same time the volume of flow is at a maximum because of the open throttle, thus producing a maximum mixture velocity and greatly reducing the heating effect of the exhaust jacket.

It will thus be seen that I have provided an improved and simplified heat control which does away with the complicated and difficult regulation of the heating fluid.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a throttle controlled internal combustion engine the combination of an intake manifold, of a chamber for heating fluid formed in said manifold and having a relatively thin tubular passage through said heating chamber forming part of said intake manifold, a segmental lining for said tubular passage radially shiftable relative thereto, and means associated with said throttle for shifting said lining inwardly to form an air space between the lining and the said tubular passage when said throttle is opened.

2. In a throttle controlled internal combustion engine the combination of an intake manifold, of a chamber for heating fluid formed in said manifold and having a relatively thin tubular passage through said heating chamber forming part of said intake manifold, a segmental lining for said tubular passage radially shiftable relative thereto, toggle means interconnecting said lining segments and linkage connecting said toggle means to said throttle whereby the opening thereof will withdraw said lining from contact with said tubular passage.

3. In an internal combustion engine, the combination of an intake manifold, of a chamber for heating fluid formed in said manifold and having a relatively thin tubular passage through said heating chamber forming part of said intake manifold, a segmental lining for said tubular passage radially shiftable relative thereto, and means for shifting said lining segments inwardly to form an air space between the lining and said tubular passage whereby to vary the heat conductivity thereof.

4. In an internal combustion engine the combination with an annular heating chamber having a thin tubular inner wall forming a portion of an intake conduit for the engine, of a lining for said tubular wall comprising a plurality of radially movable segments adapted when moved inwardly to form a smaller intake conduit spaced from said tubular inner wall to vary the heat conductivity thereof, and means for radially shifting said segmental lining.

5. In an internal combustion engine the combination with an annular heating chamber having a thin tubular inner wall forming a portion of an intake conduit for the engine, of a lining for said tubular wall comprising a plurality of radially movable segments adapted when moved inwardly to form a smaller intake conduit spaced from said tubular inner wall to vary the heat conductivity thereof, a valve in said intake conduit, and means associated with said valve for radially shifting said segmental lining.

6. In an internal combustion engine the combination with an intake conduit of a heating means for a portion of said conduit, and movable means associated with said heated portion of the intake conduit adapted to vary the heat transmitting capacity of the walls of the conduit.

7. In an internal combustion engine the combination with an intake conduit of a heating means for a portion of said conduit, and a heat shield movably mounted relative to said heated portion of the intake conduit whereby to vary the effective heat transmission therethrough.

8. In an internal combustion engine the combination with an intake conduit of a heating means for a portion of said conduit, movable means associated with said heated portion of the intake conduit adapted to vary the heat transmitting capacity of the walls of the conduit, means in said conduit for controlling the mixture flow therethrough, and means associated with said controlling means for operating said movable means.

9. In an internal combustion engine the combination with an intake conduit of a heating means for a portion of said conduit, a heat shield movably mounted relative to said heated portion of the intake conduit whereby to vary the effective heat transmission therethrough, means in said conduit for varying the mixture flow therethrough, and connections from said last mentioned means to the heat shield for operating the same.

10. In an internal combustion engine the combination with an intake conduit of a heating means for a portion of said conduit, and means associated with said conduit for varying the cross sectional area throughout the heated portion of said conduit.

11. In combination a conduit for a heated fluid a second conduit passing therethrough and adapted to be heated by the fluid in the first conduit, and means associated with the second conduit adapted to be moved to a position relative to the walls of said conduit to afford an insulating space to minimize heat transference from the first conduit to the second conduit.

In testimony whereof I have hereunto subscribed my name at Flint, Genesee County, Michigan.

DAVID FIRTH.